(12) United States Patent
Beach

(10) Patent No.: US 6,938,930 B1
(45) Date of Patent: Sep. 6, 2005

(54) INTEGRATED MUD FLAP WEIGHT

(75) Inventor: Phillip Beach, Winfield, KS (US)

(73) Assignee: Winfield Consumer Products, Inc., Winfield, KS (US)

( * ) Notice: Subject to any disclaimer, the term of this patent is extended or adjusted under 35 U.S.C. 154(b) by 38 days.

(21) Appl. No.: 10/777,463

(22) Filed: Feb. 12, 2004

(51) Int. Cl.[7] .............................................. B62D 25/18
(52) U.S. Cl. ..................................... 280/851; 280/848
(58) Field of Search ........................... 280/847, 152.05, 280/152.1–152.3, 848, 154, 849, 851, 852; D12/184, 185

(56) References Cited

U.S. PATENT DOCUMENTS

| | | | | |
|---|---|---|---|---|
| 3,237,963 A | * | 3/1966 | Menzer | 280/851 |
| 3,279,818 A | * | 10/1966 | Jones | 280/851 |
| 3,582,108 A | * | 6/1971 | Carlton | 280/851 |
| 4,061,352 A | * | 12/1977 | Bagne | 280/851 |
| 4,315,634 A | * | 2/1982 | Arenhold | 280/851 |
| 4,877,267 A | | 10/1989 | Leonard | |
| 4,960,294 A | | 10/1990 | Leonard | |
| 6,013,351 A | * | 1/2000 | Mahn, Jr. | 428/195.1 |
| 6,135,502 A | | 10/2000 | Howe et al. | |
| 6,197,144 B1 | * | 3/2001 | Mahn, Jr. | 156/240 |
| 6,729,652 B2 | * | 5/2004 | Cicansky | 280/847 |
| 2003/0151243 A1 | * | 8/2003 | Horinek | 280/848 |

FOREIGN PATENT DOCUMENTS

| | | | |
|---|---|---|---|
| EP | 0058508 | * | 8/1982 |
| FR | 2570668 | * | 3/1986 |
| JP | 632253 | * | 2/1984 |

OTHER PUBLICATIONS

Printout from Internet web site www.atwchrome.com-teaches mudflap weights.*

* cited by examiner

*Primary Examiner*—Bryan Fischmann
(74) *Attorney, Agent, or Firm*—Fellers, Snider, Blankenship, Bailey & Tippens, P.C.

(57) ABSTRACT

A mud flap of the type typically used on motor vehicles is constructed of thermoplastic material that defines a cavity therein. An opening in the front surface of the mud flap communicates with the cavity. A bottom surface of the cavity defines an area that is larger than an area defined by edges of the opening such that the front surface overhangs the bottom surface of the cavity. A mud flap weight is sized such that when the mud flap is located within the cavity, the front surface overhang secures the mud flap within the cavity. The resulting mud flap assembly has a clean, attractive appearance and eliminates potentially dangerous bolt protrusions typically found on other designs.

10 Claims, 2 Drawing Sheets

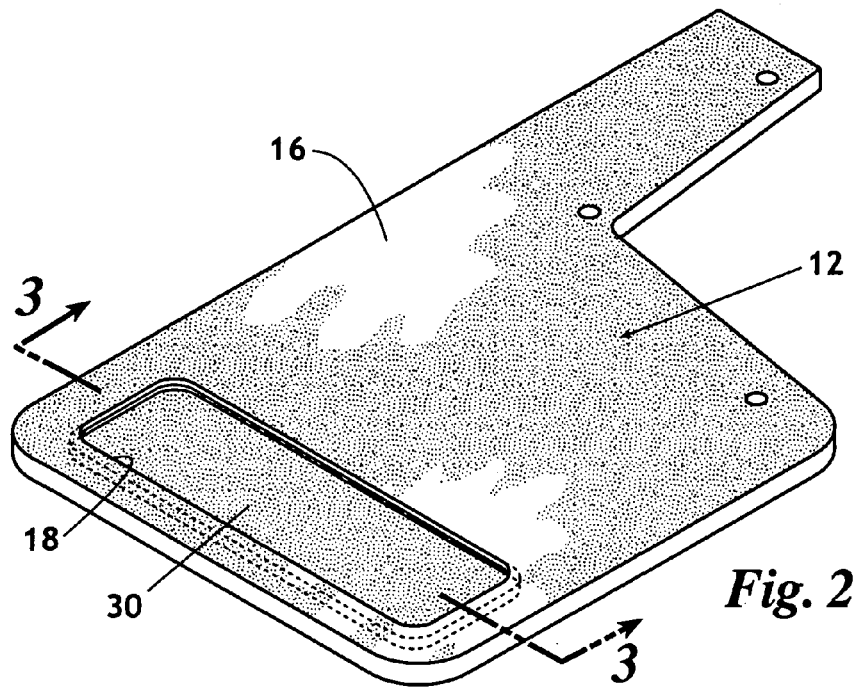
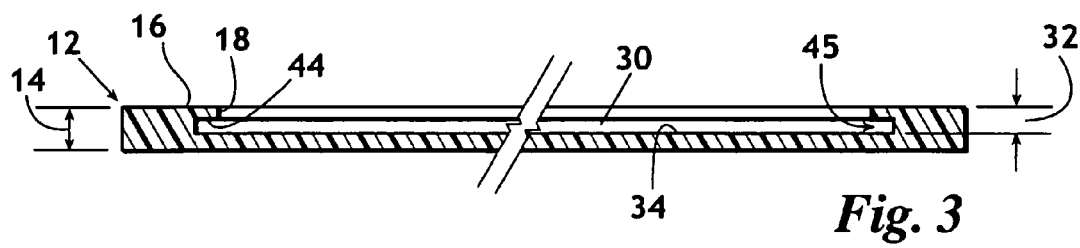
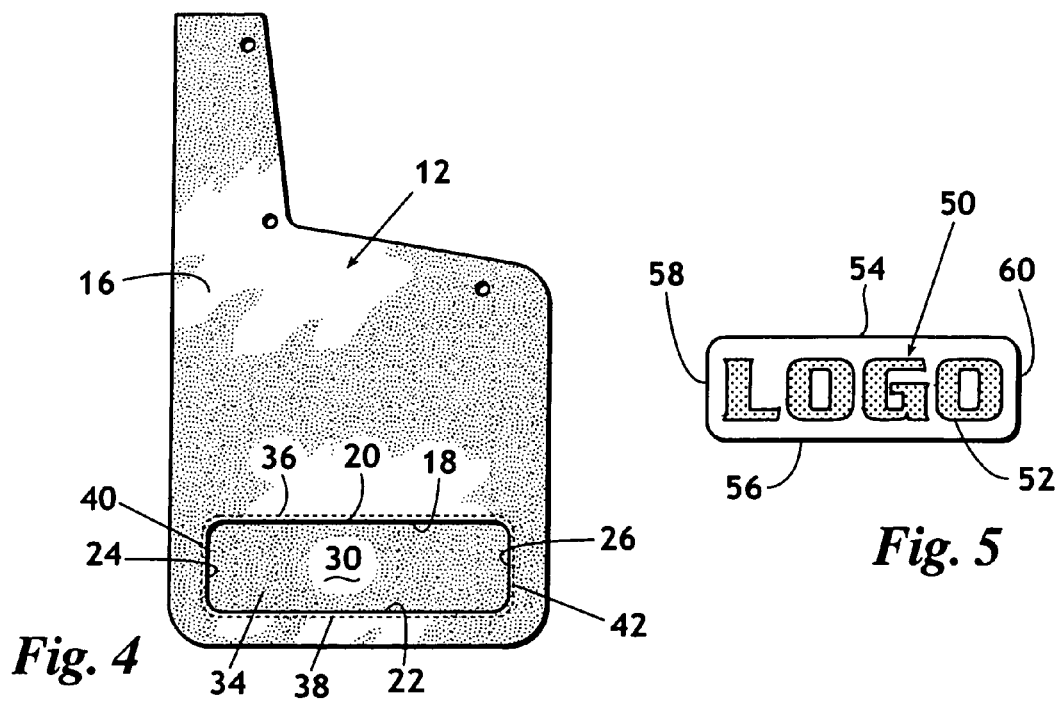

INTEGRATED MUD FLAP WEIGHT

BACKGROUND OF THE INVENTION

1. Field of the Invention

This invention relates generally to mud flaps for vehicles. More particularly, the invention relates to a mud flap having an integral mud flap weight.

2. Background

Mud flaps are well known for mounting behind the wheel of a vehicle, such as a truck, for preventing rocks and debris that may be thrown up from the rolling wheel of a vehicle from striking the vehicle body. It is known to install mud flap weights to a mud flap to assist in keeping the mud flap substantially vertical during travel and for decorative purposes.

Typically, mud flap weights are affixed to a mud flap by affixing the mud flap weight to the mud flap with bolts that pass through the weight and the flap. A disadvantage associated with bolt-on attachment methods is that the protruding bolts may contact the tire, which may result in damage to the mud flap, the tire, or both. Further, the protruding bolts or rivets are unsightly and create an unattractive appearance. There is also a cost associated with making holes in the weight and the flap as well as with the nuts and bolts or rivets.

SUMMARY OF THE INVENTION

According to the present invention there is provided an improvement in a mud flap of the type typically used on motor vehicles. The mud flap of the invention includes a sheet of flexible, preferably thermoplastic, material. The sheet of thermoplastic material has a front surface and a rear surface and defines a thickness therebetween. The front surface defines an opening. The opening has a top edge, a bottom edge, a left side edge and a right side edge.

A cavity may be provided that communicates with the opening. The cavity is defined by the sheet of thermoplastic material and has a depth that is less than the thickness of the sheet. Preferably, the cavity has a bottom surface and is defined by the sheet of thermoplastic material at a top edge, a bottom edge, a left side edge and a right side edge of the bottom surface of the cavity. The bottom surface of the cavity defines an area that is larger than an area defined by edges of the opening such that the front surface overhangs the bottom surface of the cavity.

A mud flap weight has a top edge, a bottom edge, a left side edge and a right side edge that is complementary to the edges of the bottom surface. The mud flap weight is sized such that when the mud flap weight is located within the cavity, the front surface overhang of the mud flap secures the mud flap weight within the cavity.

The resulting mud flap assembly has a clean, attractive appearance. Additionally, by locating the mud flap weight within the mud flap cavity, bolts are eliminated that could potentially strike and damage a vehicle tire.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 2 is a perspective view of the mud flap of the invention with the mud flap weight removed.

FIG. 3 is a cross-sectional view taken along lines 3—3 of FIG. 2 showing a cross-section of the mud flap of the invention.

FIG. 4 is a top view of the mud flap of the invention showing edges of a bottom surface of the mud flap weight cavity with phantom lines.

FIG. 5 is a mud flap weight for use with the mud flap of FIGS. 1 through 4.

DETAILED DESCRIPTION OF THE PREFERRED EMBODIMENT

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Figure 6:
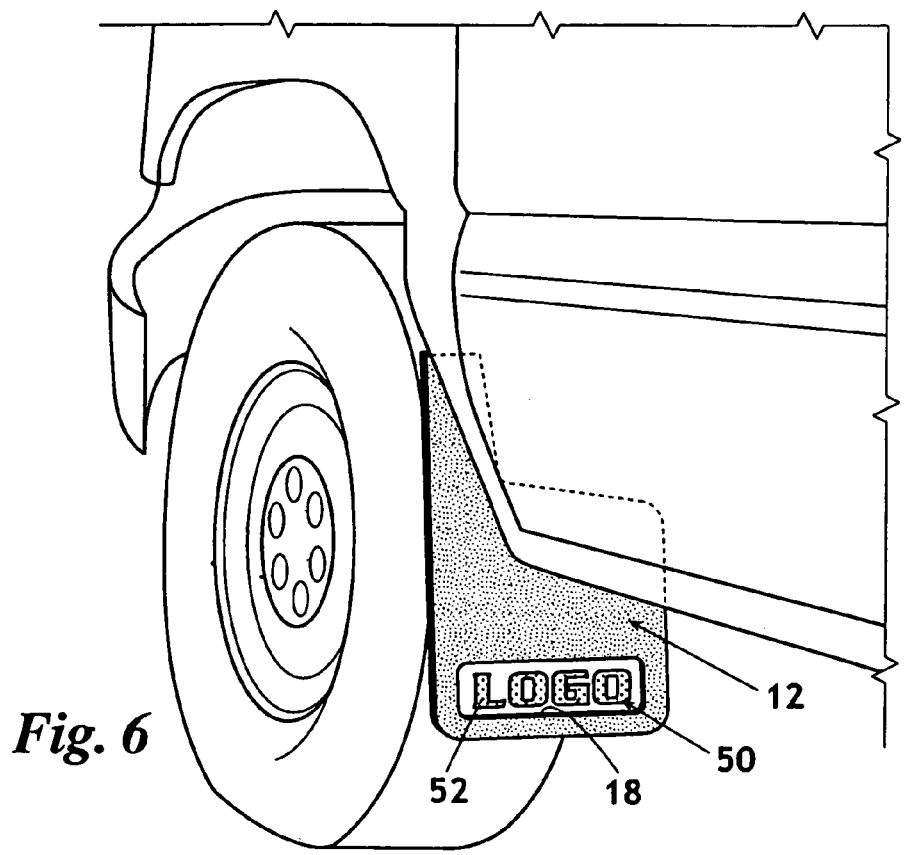
FIG. 6 is a perspective view of a mud flap installed on a vehicle.
Figure 1:
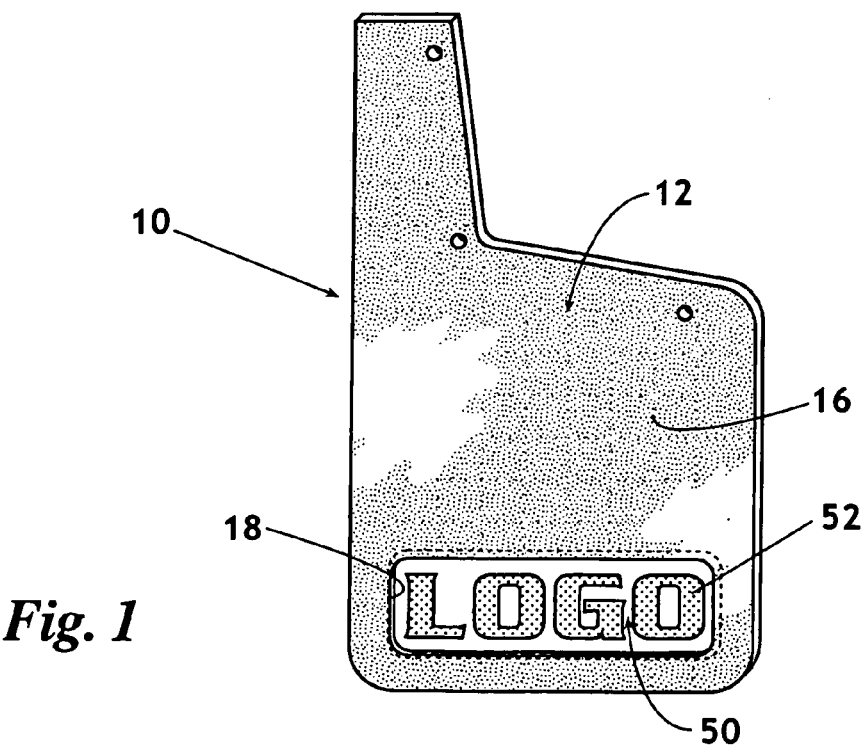
FIG. 1 is a perspective view of a mud flap incorporating the invention.

Referring now to FIGS. 1 through 5, shown is a mud flap with integral mud flap weight 10. Mud flap with integral mud flap weight 10 is made up of a mud flap comprising a sheet of thermoplastic material 12. Sheet of thermoplastic material 12 has a thickness 14 (FIG. 3) and a front surface 16. Front surface 16 defines an opening 18 therein. As can be seen most clearly in FIG. 4, opening 18 defines a top edge 20, a bottom edge 22, a left side 24 and a right side edge 26.

Opening 18 provides access to cavity 30. Cavity 30 is defined by the sheet of thermoplastic material 12 and preferably has a depth 32 that is less than thickness 14 of the sheet of thermoplastic material 12. However, other embodiments, including an opening that is formed on front surface 16 and on a rear surface are contemplated as being within the scope of the invention. In the preferred embodiment, as can be seen in FIG. 4, cavity 30 has a bottom surface 34 that is defined by the sheet of thermoplastic material 12 at a top edge 36, a bottom edge 38, a left side edge 40 and a right side edge 42 of bottom surface 34.

Bottom surface 34 defines an area that is larger than the area defined by edges 20, 22, 24 and 26 of opening 18. As a result, front surface 16 of sheet of thermoplastic material 12 forms an overhang 44 (FIG. 3) that extends over bottom surface 34 of cavity 30. Overhang 44 and bottom surface 34 define a weight perimeter engaging area 45. Weight perimeter engaging area 45 and overhang 44 preferably surround opening 18. However, the weight perimeter engaging area 45 and overhang 44 may only partially surround opening 18.

A mud flap weight 50 is preferably manufactured of a dense material such as stainless steel, aluminum or other types of metal or other materials. However, mud flap weight 50 may be made of any material. To enhance the appearance of mud flap weight 50, the mud flap weight 50 may be chrome plated, painted or receive other surface treatment. Mud flap weight 50 may be decorated with letters, images or other insignia 52. Mud flap weight 50 has a top edge 54, bottom edge 56, left side edge 58 and right side edge 60. Mud flap weight 50 is sized such that edges 54, 56, 58 and 60 preferably engage edges 36, 38, 40 and 42 of bottom surface 34, but extend beyond top edge 20, bottom edge 22, left side 24 and right side 26 of opening 18 so that overhang 44 can secure mud flap weight 50 in the weight perimeter engaging area 45. Therefore, when mud flap weight 50 is located within cavity 30, overhang 44, which surrounds cavity 30, secures mud flap weight 50 within cavity 30.

Since mud flap weight 50 is larger than opening 18, mud flap weight 50 is securely retained within cavity 30. To install mud flap weight 50 within cavity 30, the sheet of thermoplastic material 12 is heated, which thermally expands the flap and, accordingly, the opening 18. Heating the thermoplastic material 12 to approximately 300° F. sufficiently expands the opening 18 to insert the room temperature weight 50 into the opening 18. Mud flap weight 50 is then slipped within the opening 18. Once the sheet of thermoplastic material 12 is allowed to cool, the opening 18 contracts and the mud flap weight 50 is secured within cavity 30.

While in connection with the description of the preferred embodiment, opening 18 and weight 50 have been illustrated as rectangular in shape, it should be appreciated that any desired shape, whether square, round, oval or otherwise, falls within the scope of the invention.

Advantages of the integrated mud flap and mud flap weight of the invention include a cleaner appearance than traditional bolt-on mud flap weights. Additionally, by eliminating the bolts used to affix traditional mud flap weights to mud flaps, the potential hazard associated with contacting truck tires with the protruding bolts is eliminated along with the associated costs of parts and labor.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A mud flap comprising:
   a sheet of thermoplastic material having a front surface and a rear surface;
   an opening defined by said front surface of said sheet of thermoplastic material, said opening defining an area;
   a weight perimeter engaging surface defining a weight receiving area defined by said sheet of thermoplastic material wherein said weight receiving area is greater than said area of said opening; and
   a mud flap weight having a perimeter defining a weight area, said perimeter sized to be received in said weight receiving area wherein said weight receiving area is greater than said area of said opening.

2. The mud flap according to claim 1 wherein:
said weight perimeter engaging surface is adjacent to a top edge and a bottom edge of said opening.

3. The mud flap according to claim 1 wherein:
said weight perimeter engaging surface is adjacent to a right edge and a left edge of said opening.

4. The mud flap according to claim 1 wherein:
said weight perimeter engaging surface is adjacent to a top edge, a bottom edge, a right edge and a left edge of said opening.

5. The mud flap according to claim 1 wherein:
said rear surface is continuous and forms a bottom surface of a cavity defined by said opening and said weight perimeter engaging surface.

6. The mud flap according to claim 1 wherein:
said mud flap weight is rectangular in shape.

7. The mud flap according to claim 1 wherein:
said mud flap weight is inscribed with symbols on a front face of said mud flap weight.

8. A mud flap comprising:
   a sheet of thermoplastic material having a thickness and a front surface, said front surface defining an opening therein;
   a cavity defined by said sheet of thermoplastic material, said cavity having a depth less than said thickness of said sheet of thermoplastic material and said cavity having a bottom surface having edges defined by said sheet of thermoplastic material;
   wherein said bottom surface defines a weight receiving area that is larger than an opening area defined by edges of said opening such that said front surface overhangs said bottom surface of said cavity;
   a mud flap weight having edges that are complementary to said edges of said bottom surface, such that when said mud flap weight is located within said cavity, said front surface of said overhang of said sheet of thermoplastic material secures said mud flap weight within said cavity.

9. The mud flap according to claim 8 wherein:
said mud flap weight is inscribed with symbols on a front face of said mud flap weight.

10. The mud flap according to claim 8 wherein:
said mud flap weight is rectangular in shape.

\* \* \* \* \*